United States Patent [19]
Takeda et al.

[11] Patent Number: 6,163,612
[45] Date of Patent: *Dec. 19, 2000

[54] CODING DEVICE, DECODING DEVICE AND IC CIRCUIT

[75] Inventors: Harumi Takeda, Osakasayama; Akihiko Kamijo, Nagano-ken; Ayao Wada, Tokyo, all of Japan

[73] Assignee: Kanekichi Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/843,047

[22] Filed: Apr. 28, 1997

[30] Foreign Application Priority Data

Jul. 8, 1996 [JP] Japan ................................. 8-177751

[51] Int. Cl.$^7$ ................................. H04L 9/30; H04L 9/14
[52] U.S. Cl. .......................... 380/285; 380/281; 380/47; 705/71; 713/172
[58] Field of Search ............................. 380/9, 23, 4, 29, 380/47, 285, 283, 282, 251; 235/432, 375; 705/71, 65; 713/172, 193

[56] References Cited

U.S. PATENT DOCUMENTS

| | | | |
|---|---|---|---|
| 4,357,529 | 11/1982 | Atalla | 380/23 |
| 4,650,975 | 3/1987 | Kitchener | 235/375 |
| 4,652,990 | 3/1987 | Pailen et al. | 705/56 |
| 4,827,113 | 5/1989 | Rikuna | 235/432 |
| 4,910,774 | 3/1990 | Barakat | 380/23 |
| 5,073,935 | 12/1991 | Pastor | 380/285 X |
| 5,077,790 | 12/1991 | D'Amico et al. | 380/23 |
| 5,199,069 | 3/1993 | Barrett et al. | 380/47 X |
| 5,224,166 | 6/1993 | Hartmann, Jr. | 380/282 X |
| 5,253,293 | 10/1993 | Shigemitsu et al. | 380/9 |
| 5,293,029 | 3/1994 | Iijima | 235/380 |
| 5,381,478 | 1/1995 | Iijima | 380/281 X |
| 5,442,645 | 8/1995 | Ugon et al. | 380/29 |
| 5,619,570 | 4/1997 | Tsutsui | 380/4 |

FOREIGN PATENT DOCUMENTS

| | | |
|---|---|---|
| 172047 | 2/1986 | European Pat. Off. . |
| 588339 | 3/1994 | European Pat. Off. . |
| 2536928 | 6/1984 | France . |
| 9320538 | 10/1993 | WIPO . |

OTHER PUBLICATIONS

D. W. Davies et al., "Security for Computer Networks", John Wiley and Sons, 1984, section 6.2, pp. 146–149.

Bruce Schneier, "Applied Cryptography, Second Edition", pp. 125–134, 173–174, 197–198, 1996.

*Primary Examiner*—Gilberto Barron, Jr.
*Attorney, Agent, or Firm*—Lorusso & Loud

[57] ABSTRACT

A coding device, a decoding device, and an IC card capable of establishing highly reliable security are disclosed. A random number determining section 11, using a random number generating procedure selected with a random number generating procedure selecting section 10, determines a random number (a first secret key) C according to random number selecting information. On the other hand, an algorithm selecting section 13 selects a secret key code type of algorithm E according to algorithm selecting information. A secret key coding section 12, using the random number C and the algorithm E, converts data to be coded B into a secret key code sentence. After a publicized key coding section 15 converts the random number C and the algorithm selecting information into a publicized key code sentence, a combined code sentence forming section 14 forms a combined code sentence by combining together the secret key code sentence and the publicized key code sentence.

9 Claims, 6 Drawing Sheets

CODING DEVICE, DECODING DEVICE AND IC CIRCUIT

BACKGROUND OF THE INVENTION

This invention relates to a coding device and a decoding device used for keeping secrecy of necessary data, and an IC card for storing data necessary for security in coded form, and more particularly to a technique for enhancing reliability in security by coding.

In recent years in Japanese public gamble game shops or Pachinko parlors where pinball machine-like ones are used with steel (Pachinko) balls, prepaid cards are in use when the Pachinko balls or medals are lent to customer players. In order for a customer to borrow the steel balls, the customer has only to put a prepaid card into a reader-writer. The prepaid cards are so convenient for customers because customers do not have to take out coins every time they play that the prepaid cards are nowadays widely in use.

However, the present type of prepaid card is often involved in incidents in which an unauthorized person fraudulently alters the card by rewriting the content data such as kinds of money stored in the card to use it unlawfully. Unlawful use is done on a large scale and enormous amount of damage is inflicted on prepaid card managing companies. In spite of ciphered inside data necessary for security, unfortunate result is that third parties decipher, unlawfully rewrite and alter the data. That is to say, inside data are not ciphered appropriately. Preventing inside data from illegal alteration is also required for magnetic cards and IC cards used as credit cards and cash cards.

SUMMARY OF THE INVENTION

Objects of this invention are the following three; to provide a ciphering device capable of ciphering in such a way that is difficult for a third party to decipher and capable of establishing a highly reliable security, to provide a deciphering device capable of deciphering the cipher that is hard for a third party to decipher, and to provide an IC card capable of preventing the ciphered data from being deciphered by a third party while establishing a highly reliable security.

In accomplishing the foregoing objects, there is provided in accordance with the present invention a coding device comprising:

(A) random number generating procedure storing means for storing at least one random number generating procedure, (B) random number determining means for determining random numbers according to random number selecting information using said random number generating procedure, (C) algorithm storing means for storing at least one secret key code type of algorithm, (D) secret key coding means for obtaining a secret key code sentence by coding data to be coded according to said secret key code type of algorithm by the use of said determined random number as the first secret key, (E) publicized key coding means for obtaining a publicized key code sentence by coding at least said first secret key by the use of a publicized key according to a publicized key code type of algorithm, and (F) combined code sentence forming means for forming a combined code sentence in which said secret key code sentence and said publicized key code sentence are combined.

With the above coding device, a combined code sentence is formed in which are combined together; a secret key code sentence obtained by coding the data to be coded by the secret key code system, and a publicized key code sentence obtained by coding the secret key (the first secret key of the invention) used in forming the secret key code sentence by the publicized key code system. The first secret key necessary for decoding the secret key code sentence is coded by the publicized key code system, and the publicized key code sentence and the secret key code sentence are combined together to form the combined code sentence. Therefore, secret is held for the first secret key to be sent from the coding (sending) side to the decoding (receiving) side.

By the way, the term coding as used herein refers to the ordinary coding in which original information (ordinary sentence) is converted to a form or code information (code sentence) which is hard to understand for a third party. That is to say, conversion from an ordinary sentence to a code sentence is referred to as coding, and that from a code sentence to an ordinary sentence is referred to decoding. Coding and decoding are carried out by means of their algorithms and keys. In the case of the secret key code type of process, the same secret coding key and algorithm are used on both coding and decoding sides. In the case of publicized key code type of process, while the same algorithm is used on both coding and decoding sides, keys are different; the coding side uses a publicized key publicized on the decoding (receiving) side, while the decoding side uses a secret key (the second secret key of the invention) corresponding to the decoding side's own publicized key.

In one preferred embodiment, the random number generating procedure storing means stores a plurality of random number generating procedures, and the coding device further comprises (G) random number generating procedure selecting means for selecting one out of the plurality of stored random number generating procedures, the random number determining means determines random numbers according to the random number selecting information using the random number generating procedure selected with the random number generating procedure selecting means.

With the above coding device, the random number generating procedure selecting means randomly selects a random number generating procedure from a plural number of random number generating procedures stored in the random number generating procedure storing means according to random number generating procedure selecting information. Using the selected random number generating procedure, the random number determining means randomly determines a random number according to the random number selecting information and uses the random number as the first secret key for coding the secret key. Thus, since the first secret key is determined at random, it is very difficult for a third party to fraudulently locate the first secret key in comparison with the case in which the first secret key is determined by the use of a single, unchanged random number generating procedure.

In one preferred embodiment, the algorithm storing means stores a plurality of secret key code type of algorithms and the coding device further comprises (H) algorithm selecting means for selecting one out of the plurality of secret key code type of algorithms according to information for selecting secret key code type of algorithm, the secret key coding means being for obtaining a secret code sentence by coding data to be coded according to the secret key code type of algorithm selected with the algorithm selecting means by the use of the determined random number as the first secret key, and the publicized key coding means being for obtaining a publicized key code sentence by coding the first secret key and the secret key type of algorithm selecting information by the use of a publicized key and according to publicized key code type of algorithm.

With the above coding device, the secret key code sentence is formed by means of a secret key code type of algorithm randomly selected from a plural number of secret key code type of algorithms stored in the algorithm storing means according to the secret key code type of algorithm selecting information by the algorithm selecting means. Then, the first secret key for coding the secret key and the secret key code type of algorithm selecting information are coded by the publicized key code type of process to obtain a publicized key code sentence. The publicized key code sentence and the above-mentioned secret key code sentence are combined to form a combined code sentence. Therefore, to decode the secret key code sentence, secret key code type of algorithm selecting information as well as the first secret key is necessary. In other words, for an unauthorized third party, illegal decoding of a code sentence is very difficult because it is necessary to locate the secret key code type of algorithm used out of a plural number of ones.

In one preferred embodiment, the coding device further comprises, (I) data arrangement changing means for changing data arrangement by applying stream cipher type of data arrangement changing process to combined code sentences.

With the above coding device, data arrangement of the combined code sentence made up of the secret key code sentence and the publicized key code sentence is changed by the stream cipher type of process using the data arrangement means. In the combined code sentence, the secret key code sentence and the publicized key code sentence are intertwined each other and discrimination between the two is difficult.

In another aspect, the present invention provides a decoding device for decoding a combined code sentence obtained by combining a secret key code sentence obtained by coding data to be coded according to any secret key code type of algorithm and by the use of a random number as the first secret key which random number being determined from random number selecting information according to any random number generating procedure, with a publicized key code sentence obtained by coding at least said first secret key according to publicized key code type of algorithm and by the use of a publicized key, said decoding device comprising:

(a) algorithm holding means for holding said secret key code type of algorithm, (b) publicized key code type of holding means for holding the second secret key corresponding to said publicized key and a publicized key code type of algorithm, (c) publicized key code decoding means for obtaining at least said first secret key for decoding said secret key code sentence by decoding a publicized key code sentence according to said publicized key code type of algorithm and using said second secret key for decoding said publicized key code sentence, and (d) secret key code decoding means for obtaining data to be coded by decoding a secret key code sentence according to said secret key code type of algorithm using said first secret key.

The above decoding device decodes the combined code sentence formed with the coding device described above. First, using the publicized key code type of algorithm and the second secret key for decoding the publicized code sentence held in the publicized key code type of holding means, the publicized key code decoding means decodes the publicized key code sentence in the combined code sentence. As a result, the first secret key used in forming the secret key code sentence is obtained. Data to be coded is obtained when the secret code decoding means decodes the secret key code sentence by the use of the first secret key and the same secret key code type of algorithm as that used in the coding.

In one preferred embodiment, the combined code sentence is obtained by combining together, a secret key code sentence obtained by coding data to be coded according to a secret key code type of algorithm selected from a plurality of secret key code type of algorithms according to secret key code type of algorithm selecting information and by the use of a random number as the first secret key which random number being determined according to random number selecting information, and a publicized key code sentence obtained by coding at least the first secret key and the secret key code type of algorithm selecting information by the use of a publicized key according to publicized key code type of algorithm, the algorithm holding means being for holding the plurality of secret key code type of algorithm, the publicized key code decoding means being for obtaining the first secret key for decoding the secret key code sentence and the secret key code type of algorithm selecting information by decoding the publicized key code sentence according to the publicized key code type of algorithm by the use of the second secret key for decoding the publicized key code sentence, and the decoding device comprises, (e) algorithm specifying means for specifying the secret key code type of algorithm used when obtaining the secret key code sentence from a plurality of secret key code type of algorithms held in the algorithm holding means from the obtained secret key code type of algorithm selecting information, the secret key code decoding means being for obtaining data to be coded by decoding the secret key code sentence according to the specified secret key code type of algorithm and by the use of the first secret key.

The above decoding device decodes the combined code sentence formed with the above coding device. First, using the publicized key code type of algorithm and the second secret key for decoding the publicized code sentence held in the publicized key code type of holding means, the publicized key code decoding means decodes the publicized key code sentence in the combined code sentence. As a result, the first secret key used in forming the secret key code sentence and secret key code type of algorithm selecting information are obtained. Next, on the basis of the obtained secret key code type of algorithm selecting information, the algorithm specifying means specifies the secret key code type of algorithm used when obtaining the secret code sentence from the plural number of secret key code type of algorithms stored in the algorithm holding means. Thus, the secret key code type of algorithm and the first secret key used in forming the secret key code sentence are known. Data to be coded is obtained when the secret key code decoding means decodes the secret key code sentence by the use of the first secret key and the specified secret key code type of algorithm.

In one preferred embodiment, the decoding device comprises (f) data arrangement restoration means for restoring the data arrangement changed by applying the stream cipher type of process to the combined code sentence, and carrying out decoding after the data arrangement change by the stream cipher process has been restored.

With the above decoding device, first, the data arrangement change applied to the code sentence by the stream cipher type of process is first restored by the use of data arrangement restoration means and then the combined sentence is decoded.

The present invention further provides an IC card comprising:

(A) random number generating procedure storing means for storing at least one random number generating procedure, (B) random number determining means for determining random numbers according to random number selecting information using said random number generating procedure, (C) algorithm storing means for storing at least one secret key code type of algorithm, (D) secret key coding means for obtaining a secret key code sentence by coding data to be coded according to said secret key code type of algorithm by using said determined random number as the first secret key, (E) publicized key coding means for obtaining a publicized key code sentence by coding at least said first secret key by the use of a publicized key according to a publicized key code type of algorithm, and (F) receiving means for receiving from outside said combined code sentence obtained by combining together said secret key code sentence and said publicized key code sentence by the use of a coding device constituted with combined code sentence forming means, code sentence holding means for holding the combined sentence received, and transmission means for sending outside the code sentence read from said code sentence holding means.

With the above IC card, the receiving means receives the combined sentence formed with the above coding device, and holds the combined code sentence received with the code holding means. At the same time, the transmission means sends out the combined code sentence read from the code holding means as required.

In one preferred embodiment, the combined code sentence is obtained by combining together a secret key code sentence obtained by coding data to be coded according to any secret key code type of algorithm using a random number as a first secret key determined from random number selecting information using any random number generating procedure, and a publicized key code sentence obtained by decoding at least the first secret key according to the publicized key code type of algorithm using the publicized key, and the IC card further comprises a decoding device including (a) algorithm holding means for holding the secret key code type of algorithm, (b) publicized key code type of holding means for holding a second secret key corresponding to the publicized key and the publicized key code type of algorithm, (c) publicized key code decoding means for obtaining at least the first secret key for decoding the secret key code sentence by decoding the publicized key code sentence according to the secret key code type of algorithm using the second secret key for decoding the publicized key code sentence, and (d) secret key code decoding means for obtaining data to be coded by decoding a secret key code sentence according to the secret key code type of algorithm using the first secret key, so that the data to be coded is obtained by decoding the combined sentence read from the code sentence holding means by the use of the decoding device, and the data to be coded is sent outside by means of the transmission means.

With the above IC card, the data to be coded obtained by the use of the above decoding device for decoding the combined code sentence read as required from the code holding means is sent out from the transmission means.

In one preferred embodiment, the combined code sentence is obtained by combining together a secret key code sentence obtained by coding data to be coded according to a secret key code type of algorithm selected from a plurality of secret key code type of algorithm according to secret key code type of algorithm selecting information using a random number as a first secret key determined from random number selecting information, and a publicized key code sentence obtained by coding the first secret key and the secret key code type of algorithm selecting information according to the publicized key code type of algorithm using the publicized key, the algorithm holding means being for holding the plurality of secret key code type of algorithm, and the publicized key code decoding means being for obtaining the first secret key for decoding the secret key code sentence and the secret key code type of algorithm selecting information by decoding the publicized key code sentence according to the publicized key code type of algorithm using the second secret key for decoding the publicized key code sentence, and the IC card comprises (e) algorithm specifying means for specifying the secret key code type of algorithm used when obtaining the secret key code sentence from the plurality of secret key code type of algorithms stored in sad algorithm holding means according to the obtained secret key code type of algorithm selecting information, the secret key code decoding means being for obtaining data to be coded by decoding the secret key code sentence according the specified secret key code type of algorithm by the use of the first secret key.

With the above IC card, the data to be coded obtained by the use of the above decoding device for decoding the combined code sentence read as required from the code holding means is sent out from the transmission means.

In one preferred embodiment, the IC card includes (f) data arrangement restoration means for restoring the data arrangement changed by applying the stream cipher type of process to the combined code sentence, so that the decoding is carried out after the data arrangement change by the stream cipher process has been restored.

With the above IC card, first, the data arrangement change applied to the code sentence by the stream cipher type of process is first restored by the use of data arrangement restoration means provided in the decoding device and then the combined sentence is decoded.

In one preferred embodiment, the transmission means and reception means of the above IC card are constituted to carry out contactless external transmission and reception.

With the above IC card, sending and receiving the combined code sentence and the data to be coded through the sending means and receiving means are carried out with the contactless type of process which causes less damage to the IC card and makes decoding by data tapping (taking out internal data by giving appropriate signals to outside terminals) difficult.

BRIEF DESCRIPTION OF THE DRAWINGS

Other objects, features and advantages of the present invention will become apparent from the detailed description of the preferred embodiments of the invention which follows, when considered in light of the accompanying drawings in which.

DETAILED DESCRIPTION OF THE PREFERRED EMBODIMENTS OF THE INVENTION

Figure 1:
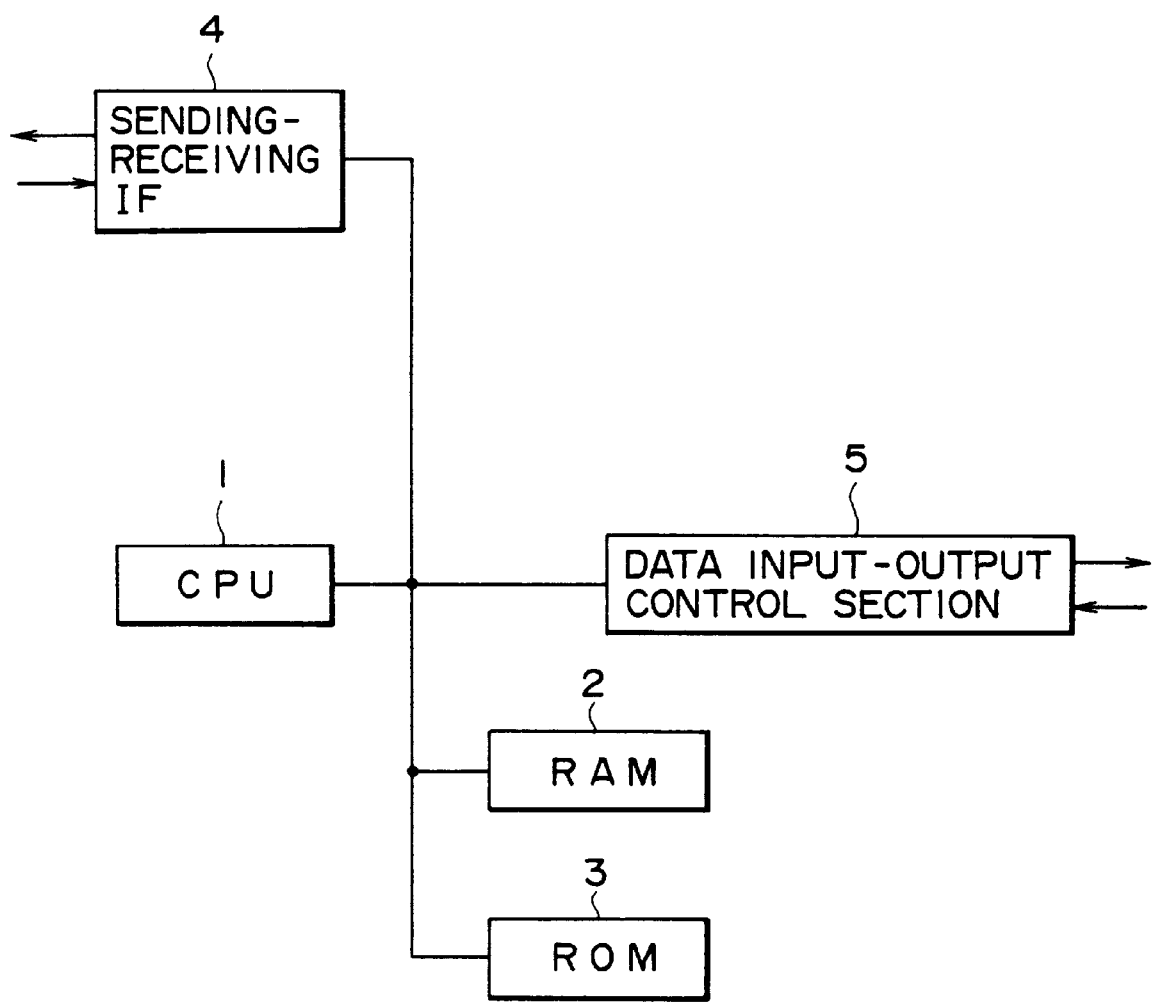
FIG. 1 is a block diagram schematically showing the constitution of a coding device of the embodiment according to the present invention.
Figure 2:
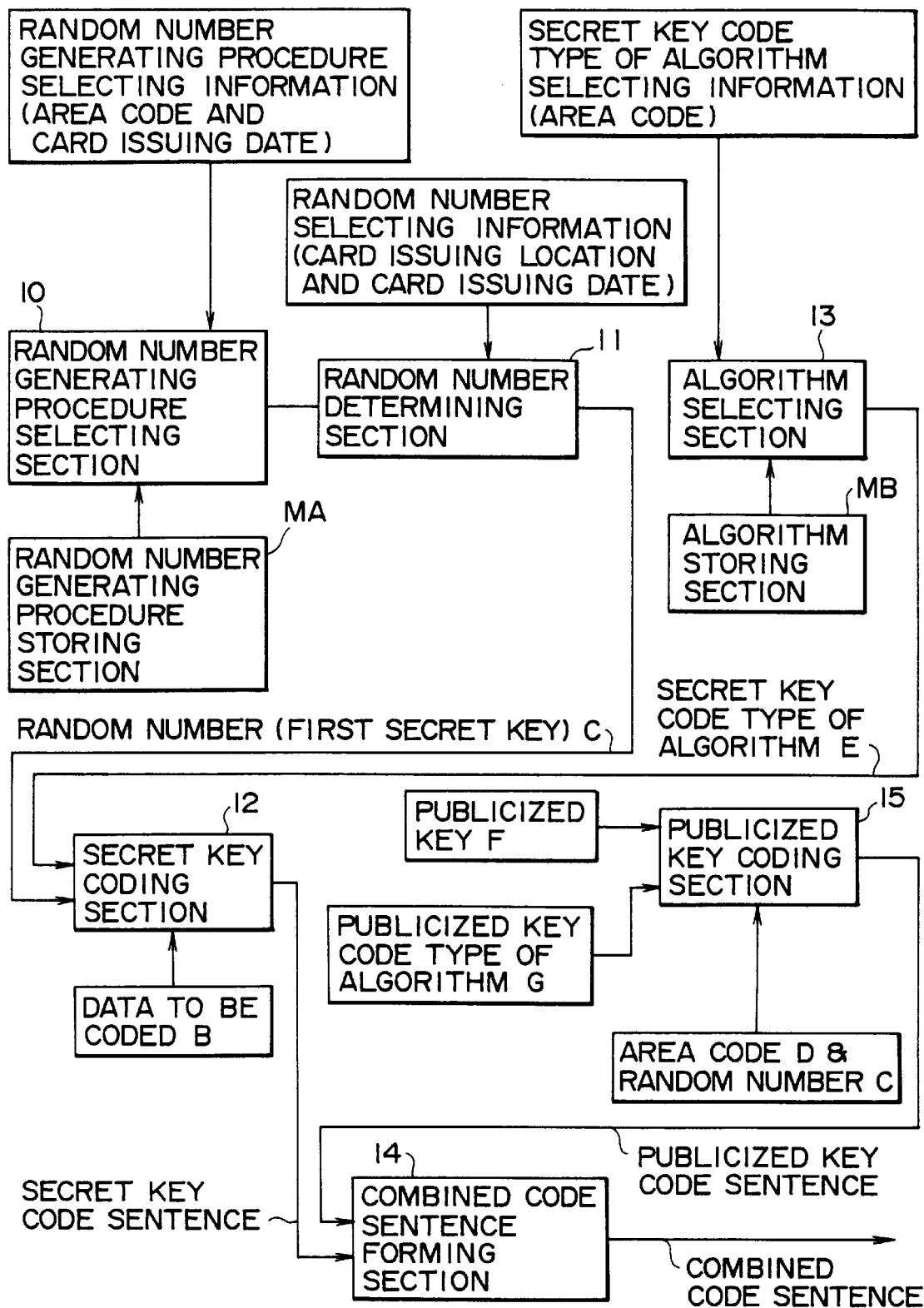
FIG. 2 is a block diagram showing the constitution of an essential part of the coding device of the embodiment.

Embodiments of the invention will be hereinafter described in reference to the appended drawings. FIG. 1 is a block diagram roughly showing a structure of a coding device according to an embodiment. FIG. 2 is a block diagram showing detailed structure of an essential part of the coding device of the invention.

The coding device of the embodiment shown in FIG. 1 comprises; a CPU 1 which is a microprocessor for controlling main control function, a RAM 2 connected to the CPU, ROM 3, a sending and receiving IF 4 for contactless exchange of signals between an IC card which will be described later, and a data input-output control section 5 for exchanging data among the various devices mentioned above.

Figure 3:
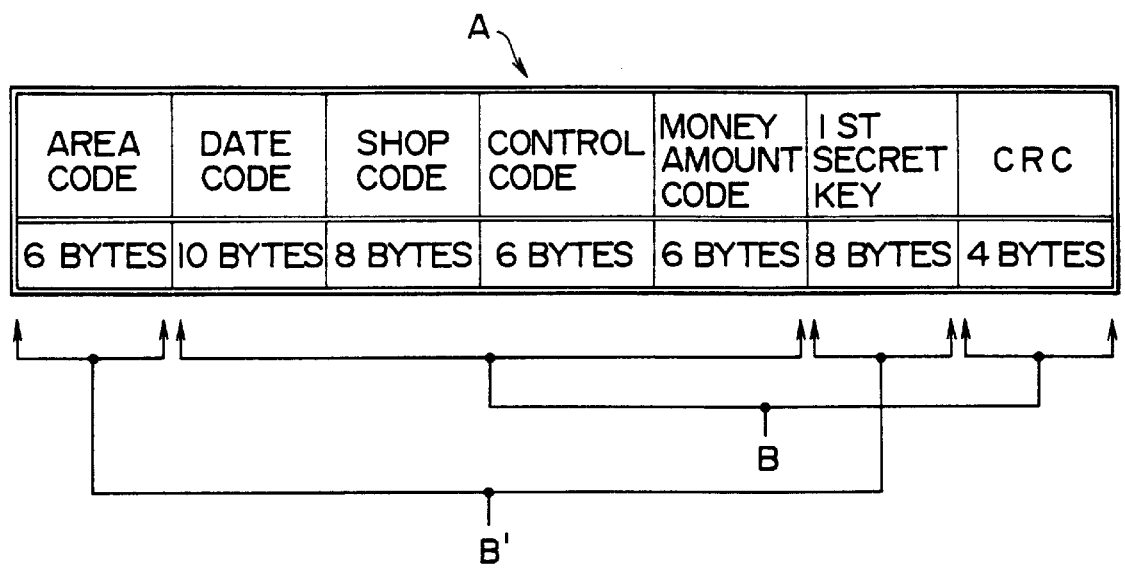
FIG. 3 is a schematic view of card information for use in the embodiment.

With the device of this embodiment, information A for an IC card shown in FIG. 3 is coded and then sent to the card. The card information A comprises 48 bytes including such pieces of information as; area code representing any of various geographical areas, card issuing date code (date code), code of a shop (such as Pachinko parlor) selling the card, control code representing a card trader or management company, amount of money represented with the card (such as yen 500, yen 1000, . . . , yen 10000), the first secret key for coding a secret key, and CRC (cyclic redundancy check code). Of these, the data B to be coded with the secret key code type of process are; the date code, shop code, control code, amount of money code, and CRC, making 34 bytes in all. The rest 14 bytes make the data B' to be coded with the publicized key code type of process.

The device of the embodiment as shown in FIG. 2 comprises; a random number generating procedure selecting section 10 for selecting one random number generating procedure out of a group of random number generating procedures stored in a random number generating procedure storing section MA constituted with a ROM 3 and others, and a random number determining section 11 for determining a random number by the use of the selected random number generating procedure. The random number generating procedure selecting section 10 selects one random number generating procedure according to the random number generating procedure selecting information such as area code and date. The kinds of the random number generating procedures stored in the random number generating procedure storing section MA include standard procedures such as; a linear combining procedure, the Knuth's random number generating procedure, M-series random number generating procedure, Wichmann-Hill's random number generating procedure. However, other unique, special random number generating procedures may also be used as a matter of course. The random number determining section 11, using the selected random number generating procedure, determines one random number C according to random number selecting information (initial values of random number generation) or the area code and the issuing location code, and sends it to a secret key coding section 12. The random number C has 8 bytes and used as the secret key (the first secret key) for secret coding.

The device of the embodiment comprises an algorithm selecting section 13 for selecting one algorithm from a group of secret key code type of algorithms stored in an algorithm storing section MB which is also constituted with the ROM 3 and others. The algorithm selecting section 13 selects one secret key code type of algorithm according to secret key code type of algorithm selecting information such as an area code D, and sends it to a secret key coding section 12 for coding through the secret key code type of process. The secret key code type of algorithms stored in the algorithm storing section MB includes the Barnum coding, DES (Data Encypnion Standard), FEAL (Fast-Date Encyphrment Algorithm), and Caeser coding. However, other unique, special algorithms may also be used as a matter of course.

The secret key coding section 12 into which the random number and the algorithm E are sent, using the random number C as a secret key (the first secret key), a secret key code sentence of 34 bytes is formed by coding the data to be coded according to the secret key code type of algorithm E selected with the algorithm selecting section 13.

On the other hand, the device of the embodiment also comprises a publicized key coding section 15 for coding of the publicized key code type of process by means of a publicized key F and a publicized key code type of algorithm G. The publicized key coding section 15, using the publicized key F and according to the publicized key code type of algorithm G, converts the random number C which is the first secret key and the area code D which is the secret key code type of algorithm selecting information into a publicized key code sentence of 14 bytes. The publicized key code type of algorithms include; the RSA publicized key code type of algorithms invented by such as Rivest, Shamir, and Adleman of the U.S. However, the algorithms are limited to those as a matter of course.

The secret key code sentence and the publicized key code sentence formed as described above are combined in the combined code sentence forming section 14 into a combined code sentence of 14 bytes, held in the RAM 2, and sent from the sending-receiving IF 4 to the IC card. Specific components shown in FIG. 2 are constituted around the CPU 1 and control programs.

As an alternative, the following constitution is possible: A data arrangement changing section (not shown) for carrying out data arrangement changing process of the stream cipher type to the combined code sentence is provided in the last stage of the combined sentence forming section 14. The combined code sentence is applied with the data arrangement changing process of the stream cipher type, held in the RAM 2, and sent from the sending-receiving IF 4 to the IC card. The data arrangement changing process is arranged for example so that the data arrangement may be changed by one byte. When the data arrangement is changed in this way with the stream cipher type of process to the combined code sentence to the IC card, the code becomes more difficult to be decoded, extremely reduces the possibility of the secret key code sentence and the publicized key code sentence to be illegally decoded, and establishes highly reliable security.

Figure 4:
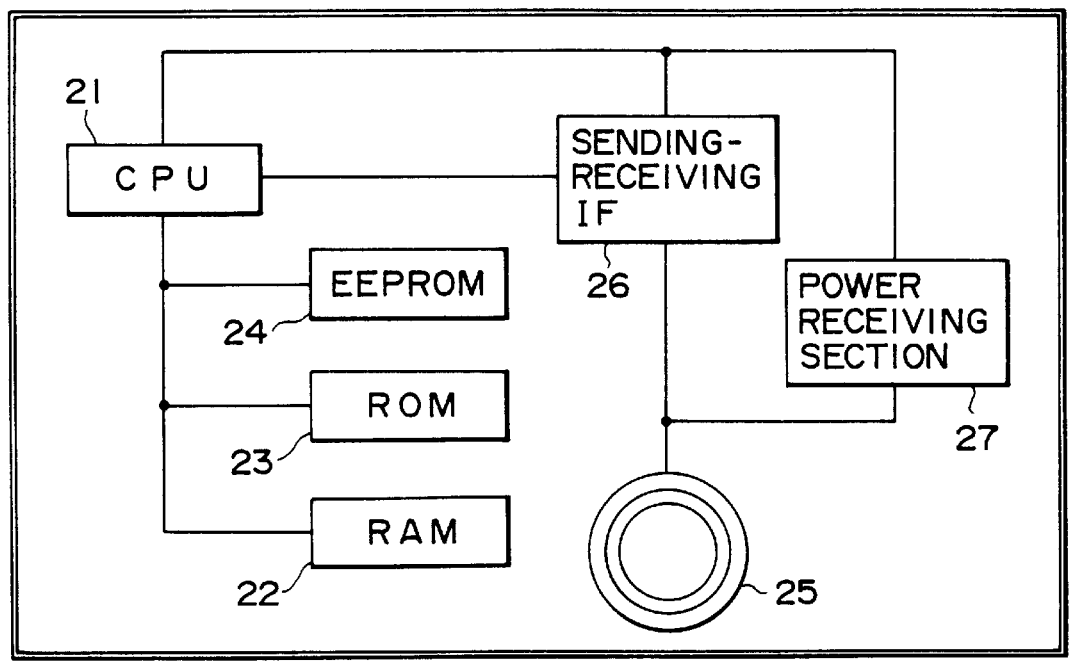
FIG. 4 is a block diagram schematically showing the constitution of an IC card of the invention.
Figure 5:
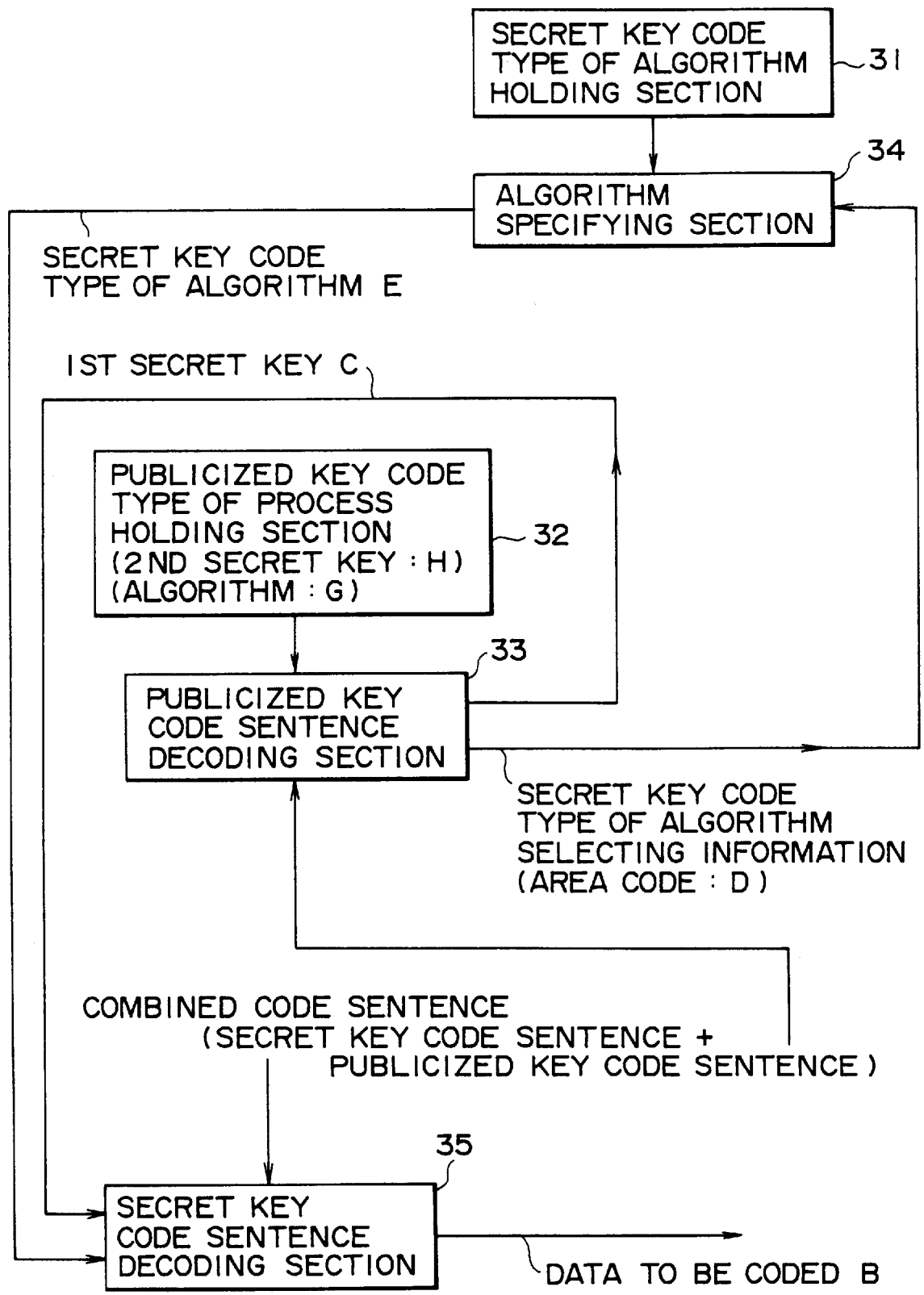
FIG. 5 is a block diagram showing the constitution of an essential part of a decoding device disposed on the IC card of the embodiment.
Figure 6A:
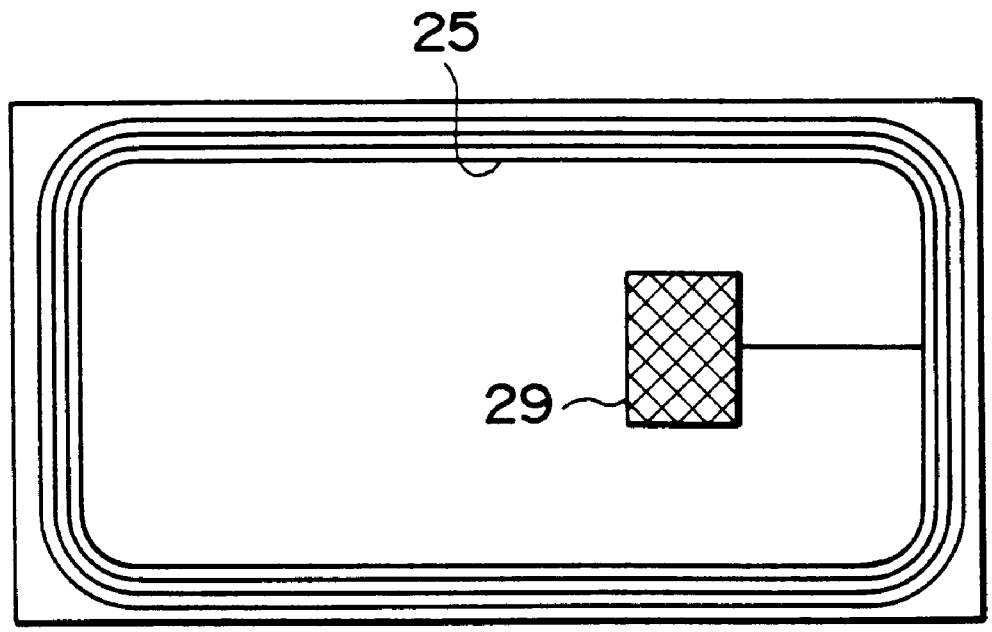
FIG. 6(a) is a plan view of the IC card of the embodiment.
Figure 6B:
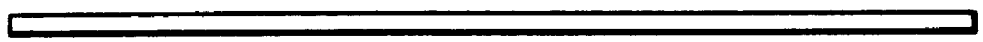
FIG. 6(b) is a side view of the IC card of FIG. 6(a)

Next will be described in detail the embodiment of the IC card of the invention using the combined code sentence formed with the coding device of the embodiment in reference to drawings. FIG. 4 is a block diagram roughly showing the structure of the IC card of the embodiment. FIG. 5 is a block diagram showing a constitution of an essential part of a decoding device provided in the IC card of the embodiment. FIG. 6 is an external view. By the way, the IC card of the embodiment is also an embodiment of the decoding device of the invention.

The IC card of the embodiment, as shown in FIG. 4, comprises; a CPU 21 or a microprocessor for controlling main control functions, a RAM 22 connected to the CPU 21, a ROM 23, an EPROM 24, a radio antenna 25 for contactless exchange of signals between the coding device and the IC card, a sending-receiving IF 26, and a power receiving section 27 for receiving power with the radio antenna 25 without contact and supplying the power to drive the IC card. In the IC card, the combined code sentence formed with the coding device of the embodiment shown in FIG. 1 described before is stored in the EPROM 24. The combined code sentence received through the radio antenna 25 and the receiving-sending IF 26 is stored in the EPROM 24. The IC card of the embodiment is made of a thin plastic of 50 mm by 80 mm rectangular shape as shown in FIG. 6(*a*) and about 0.76 mm thick as shown in FIG. 6(*b*), with the radio antenna 25 disposed to run the periphery of the card and necessary components such as an IC chip 29 disposed inside the radio antenna 25.

When the IC card of the embodiment receives a read access from outside, the received and stored combined code sentence is read from the EPROM 24, decoded inside the card with the decoding device shown in FIG. 5, and sent out through the receiving-sending IF 26 and the radio antenna 25.

A shown in FIG. 5, the embodiment device comprises an algorithm holding section 31 holding a plural number of secret key code type of algorithms and a publicized key code type of process holding section 32 holding a publicized key code type of process necessary for decoding the read out combined code sentence. The plural number of algorithms held in the algorithm holding section 31 is the same as that selectively used with the coding device according to the secret key code type of algorithm selecting information when forming the secret key code sentence in the combined code sentence, namely same as the secret key code type of algorithm group in the above-described coding device. On the other hand, the publicized key code type of process holding section 32 holds a secret key (the second secret key) H used when the publicized key code sentence in the combined code sentence is decoded, and a publicized key code type of algorithm G which is the same as that on the coding device side. The second secret key H corresponds to the publicized key F used when the publicized key code sentence is formed with the coding device.

The embodiment device also comprises a publicized key code decoding section 33 for decoding the publicized key code sentence in the combined code sentence. The publicized key code sentence decoding section 33, using the secret key H and by decoding the publicized key code sentence according to the publicized key code type of algorithm G, decodes the random number C which is the first secret key used when obtaining the secret key code sentence and the secret key code type of algorithm selecting information (area code D).

The embodiment device comprises an algorithm specifying section 34 for specifying a secret key code type of algorithm E used when obtaining the secret key code sentence from among the group of secret key code type of algorithms held in the secret key code type of algorithm holding section 31, and a secret key code sentence decoding section 35 for decoding the secret key code sentence in the combined code sentence. The algorithm specifying section 34 specifies the secret key code type of algorithm E used when obtaining the secret key code sentence from a plural number of secret key code type of processes according to the area code D which is the secret key code type of algorithm selecting information obtained with the publicized key code sentence decoding section 33. On the other hand, the secret key code decoding section 35, using the first secret key (random number C) and according to the secret key code type of algorithm E, decodes the secret key code sentence and decodes the original data to be coded. The decoded data B to be coded is sent outside contactlessly through the radio antenna 25 and the sending-receiving IF 26. The specific components shown in FIG. 5 are constituted around the CPU 21 and control programs.

When data B to be coded is renewed outside and a new combined code sentence from outside is received into the IC card, the combined code sentence which has been stored till that time in the EPROM 24 is rewritten with the new combined code sentence and stored.

By the way, when the combined code sentence used in the coding device is one to which data arrangement changing process of stream cipher type is applied, the decoding device also comprises a data arrangement restoration section (not shown) for restoring the data arrangement changing process of the stream cipher type applied to the combined code sentence, and is constituted that the decoding is made after the data arrangement change done by the stream cipher type of process is restored.

Next will be described an example of the prepaid system (hereinafter abbreviated as "system" as appropriate) using an IC card for the steel ball lending in a Pachinko parlor in reference to FIG. 7.

Figure 7:
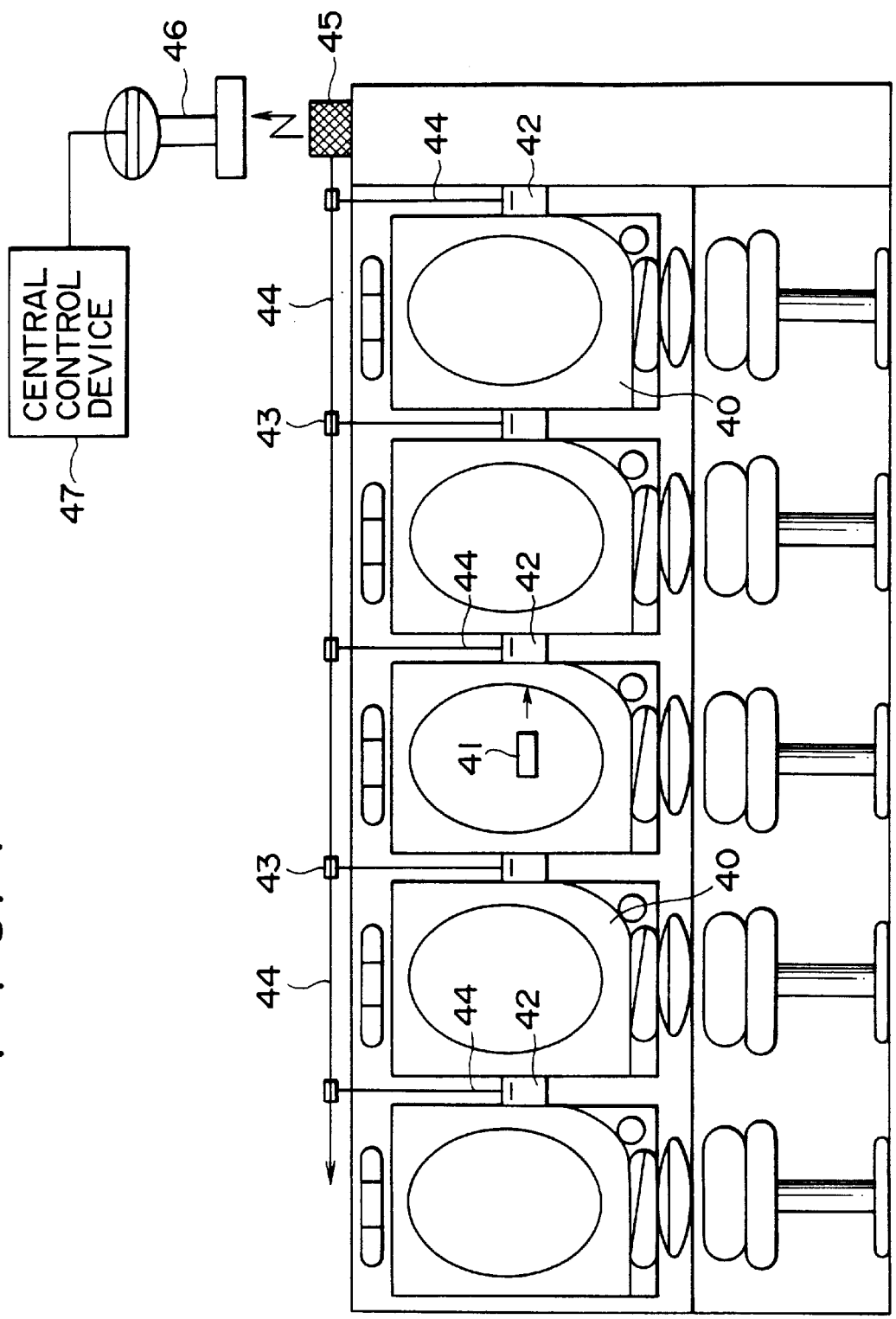
FIG. 7 is a front external view of a prepaid system for lending Pachinko balls by the use of the IC card of the embodiment.

This system comprises as shown in FIG. 7; Pachinko machines 40 arranged side by side, each provide with a reader-writer 42 for the IC card 41 of the above embodiment, each reader-writer being connected through a connector 43 and a cable 44 to a controller 45. The controller 45 has the function of forming a combined code sentence. The reader-writer 42 is provided with a radio antenna (not shown) for carrying out bidirectional, contactless communication with the IC card 41.

Upon the IC card holding the combined code sentence being inserted in the reader-writer 42, the IC card receives an access from the reader-write side, and the publicized key code sentence and the secret key code sentence of the combined code sentence are decoded in the IC card 41. As a result, the data B to be coded is obtained. The data B to be coded is sent by contactless communication to a reader-writer 42, and further sent to the controller 45. As a result, the Pachinko balls are lent out. The numerals of the money amount of the data B to be coded represent the current balance on the IC card 41 which is to be reduced according to the lent amount of the Pachinko balls and changed. The changed data B to be coded is converted to a combined code sentence at the controller 45 and sent from the reader-writer 42 to the IC card 41. In the IC card 41, the previous combined code sentence stored in the EPROM 24 is rewritten into a new combined code sentence which has come from outside, and stored.

Data necessary for controlling the card is sent appropriately from the controller 45 by means of optical communication through an optical LAN relay device 46 to a central control device 47. Since this system uses code sentences coded with this invention, security is highly reliable with almost no possibility of the code sentences being illegally or unlawfully decoded.

This invention is not limited to the above embodiment but may be modified in various ways, for example, as follows.

(1) While the IC card of the embodiment comprises a decoding device, the IC card may be without the decoding device. This IC card is constituted to read a written combined code sentence and sends it out without decoding it. In that case, the decoding device is disposed on the side of reader-writer 42, controller 45, or central control device 47 so that the combined code sentence is decoded outside the IC card.

(2) While the embodiment is arranged to code the renewed data B to be coded in the controller 45, it may also be arranged that the coding is carried out in the reader-writer 42 or central control device 47.

(3) In the embodiment, one random number generating procedure is selected at random from the random number generating procedure storing section MA storing a plural number of random number generating procedures and a random number as the first secret key is determined at random by the use of the selected random number generating procedure. However, another embodiment is possible in which only one random number generating procedure is stored and used to determine a random number. In that case, while the degree of randomness in determining the random number (the first secret key) is slightly less than that of the former embodiment, entire device structure is simplified.

(4) In the embodiment, one secret key code type of algorithm is selected from the algorithm storing section MB storing a plural number of secret key code type of algorithms according to the secret key code type of algorithm selecting information, and the secret key code sentence is formed by the use of the algorithm. However, another embodiment is possible in which only one algorithm is stored and used to form the secret key code sentence. Such an example is preferably embodied in the case in which the coding and decoding are carried out in the same control station (such as a host computer). For example, that is the case in which a combined code sentence formed in a specific control station is written to the IC card, and the written combined code sentence is decoded in the same station. In such a case, since a third party cannot learn which secret key code type of algorithm has been used for the decoding, the combined code sentence written in the IC card is reliably prevented from being unlawfully decoded and at the same time, the constitution of the coding device and the decoding device may be simplified.

(5) It is a matter of course that the kind of the publicized key code type of process and the secret key code type of algorithm, type of the key, type of the random number generating procedure and the algorithm selecting information, and the form of the data to be coded, used in the embodiment are not limited to those shown in the embodiment but may be any appropriate ones.

(6) Furthermore, the IC card described in the embodiment, in addition to being provided with the decoding device of the invention for decoding the combined code sentence, may also be constituted to be provided with a procedure for checking the user of the IC card being the right person, and with the procedure for checking the party to whom the information in the IC card is to be sent being the correct person.

(7) Furthermore, the IC card described with the embodiment may be applied, in addition to the prepaid system for lending the Pachinko balls, to various systems which require secret keeping and prevention of unlawful alteration to the information written on the IC card, for example credit cards and cash cards.

The present invention has the following effects:

With the coding device of appended claim 1, the combined code sentence is formed by combining together the secret key code sentence obtained by coding the data to be coded through the secret key coding type of process and the publicized key code sentence obtained by coding the first secret key necessary for decoding the secret key code sentence. Therefore, secrecy of the first secret key to be sent from the coding (sending) side to the decoding (receiving) side is kept and highly reliable security is established.

With the coding device of appended claim 2, the first secret key necessary for decoding the secret key code sentence is a random number generated at random by the use of a random number generating procedure selected at random from a plural number of random number generating procedures. Therefore, in comparison with the case in which a fixed random number generating procedure is used to determine the secret key, it is very difficult for a third party to unlawfully seek and locate the first secret key.

With the coding device of appended claims 3 and 4, decoding the secret key code sentence requires to know which one has been used from among the plural number of secret key code type of algorithms in addition to the first secret key. Therefore, unlawful decoding of the secret key code sentence is more difficult in comparison with the case in which the secret key code sentence is formed by the use of the algorithm using a single, fixed secret key.

With the coding device of claims appended 5–8, discrimination between the secret key code sentence and the publicized key code sentence in the combined code sentence is made difficult by the stream cipher type of process for changing the data arrangement. This makes it possible to establish highly reliable security.

With the decoding device of appended claim 9, the second secret key for decoding the publicized key code sentence and the first secret key for decoding the secret key code sentence are used to decode the combined code sentence formed with the coding device of claim 1. As a result, highly reliable security is established.

With the decoding device of appended claim 10, the second secret key for decoding the publicized key code sentence, the first secret key for decoding the secret key code sentence, and the secret key code type of algorithm selecting information are used to decode the combined code sentence formed with the coding device of claim 3 or 4. As a result, highly reliable security is established.

With the decoding device of claims 11 and 12, decoding is applied to the combined code sentence to which the stream cipher type of process is applied to make it difficult for a third party to decode. Therefore, highly reliable security is established.

With the IC card of claim 13, all the information data before being written to the IC card is coded with the coding device of claim 1 and the information data is prevented from being altered or stolen by an unauthorized third party. As a result, a card system having highly reliable security is established.

With the IC card of claim 14, the combined code sentence read as required from the code holding means is decoded with the decoding device of claim 9 to obtain the data to be coded. The data to be coded is sent outside with the sending means. That is to say, the information held in the card (combined code sentence) is different in its form from the information sent outside (decoded information). Therefore, the information held in the card (combined code sentence), even if it is stolen, is not effective unless it is decoded. As a result, security of the card system is further enhanced.

With the IC card of claim 15, decoding is carried out with the decoding device of claim 10. That is to say, the combined code sentence is decoded by the use of the first secret key for decoding the publicized key code sentence, the first secret key for decoding the secret key code sentence, and the secret key code type of algorithm selecting information, and sent out. As a result, a card system having highly reliable security is established.

With the IC card of claims 16–17, decoding of the combined code sentence is carried out after the changing process to the data arrangement of the combined code sentence through the stream cipher type of process is restored. As a result, security of the card system is further enhanced.

With the IC card of claim 19, data exchange between the IC card and outside is carried out without contact. Therefore, reading of the internal data by attaching appropriate electric signal to the card terminal, as seen in the contact type of IC cards, or decoding or stealing of the card information, so-called tapping, is difficult. As a result, a card system which is free from poor contact and less likely to be damaged while in use is established.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A coding device comprising:

random number generating procedure storing means for storing a plurality of random number generating procedures, random number generating procedure selecting means for selecting one out of said plurality of stored random number generating procedures, random number determining means for determining a random number according to random number selecting information using said selected random number generating procedure, algorithm storing means for storing at least one secret key code type of algorithm, secret key coding means for obtaining a secret key code sentence by coding data to be coded according to said secret key code type of algorithm by the use of said determined random number as the first secret key, said secret key code sentence being capable of being decoded back into said data only by use of said first secret key, publicized key coding means for obtaining a publicized key code sentence by coding at least said first secret key by the use of a publicized key according to a publicized key code type of algorithm, and combined code sentence forming means for forming a combined code sentence in which said secret key code sentence and said publicized key code sentence are combined.

2. A coding device according to claim 1, wherein said algorithm storing means stores a plurality of secret key code type of algorithms and wherein said coding device further comprises:

algorithm selecting means for selecting one out of said plurality of secret key code type of algorithms according to information for selecting secret key code type of algorithm, said secret key coding means obtaining a secret code sentence by coding data to be coded according to the secret key code type of algorithm selected with said algorithm selecting means by the use of said determined random number as the first secret key, and said publicized key coding means obtaining a publicized key code sentence by coding said first secret key and said secret key type of algorithm selecting information by the use of a publicized key and according to publicized key code type of algorithm.

3. A coding device according to claim 1, further comprising:

data arrangement changing means for changing data arrangement by applying stream cipher type of data arrangement changing process to combined code sentences.

4. A coding device according to claim 2, further comprising:

data arrangement changing means for changing data arrangement by applying stream cipher type of data arrangement changing process to combined code sentences.

5. An IC card comprising:

a processing unit;

a memory containing instructions for operating the processing unit;

an input/output for transferring information into and out of the IC card;

said memory including a location for receiving and storing a secret key code sentence and a publicized key code sentence;

said secret key code sentence being formed by coding data using a secret key code type of algorithm employing a first secret key and which can decoded only by use of said first secret key;

said publicized key code sentence being formed by coding the first secret key using a publicized key code type of algorithm employing a publicized key which is associated with a second secret key necessary to decode the publicized key code sentence;

said operating instructions including:

(a) a procedure for receiving the secret key code sentence and the publicized key code sentence via the input/output and for storing the secret key code sentence and the publicized key code sentence in the memory location, (b) a publicized key code type of decoding algorithm including the second secret key for decoding the publicized key code sentence to obtain the decoded first secret key, (c) a secret key code type of decoding algorithm for employing the decoded first secret key to decode the secret key code sentence to obtain the data, and (d) a procedure for outputting via the input/output the data decoded by said secret key code type of decoding algorithm.

6. An IC card according to claim 5 wherein said publicized key code sentence also includes secret key code type of algorithm selecting information which is coded along with the first secret key using a publicized key code type of algorithm employing the publicized key which is associated with the second secret key necessary to decode the publicized key code sentence; and said operating instructions include a plurality of secret key code type of decoding algorithms, and a selecting procedure employing the secret key code type of algorithm selecting information as decoded by the publicized key code type of algorithm for selecting one of the plurality of secret key code type of decoding algorithms to decode the secret key code sentence by use of the decoded first secret key to obtain the data.

7. An IC card according to claim 5, wherein said publicized key code sentence and said secret key code sentence are combined in a combined key code sentence which is rearranged by a stream cipher type of process; and said operating instructions further include arrangement restoration means for restoring the arrangement changed by the stream cipher type of process to the publicized key code sentence and the secret key code sentence.

8. An IC card according to claim 6, wherein said publicized key code sentence and said secret key code sentence are combined in a combined key code sentence which is rearranged by a stream cipher type of process; and said operating instructions further include arrangement restoration means for restoring the arrangement changed by the stream cipher type of process to the publicized key code sentence and the secret key code sentence.

9. An IC card according to claim 5, wherein said input/output is a contact-less transmitter and receiver.

* * * * *